United States Patent [19]

Clark et al.

[11] Patent Number: 5,594,343

[45] Date of Patent: Jan. 14, 1997

[54] WELL LOGGING APPARATUS AND METHOD WITH BOREHOLE COMPENSATION INCLUDING MULTIPLE TRANSMITTING ANTENNAS ASYMMETRICALLY DISPOSED ABOUT A PAIR OF RECEIVING ANTENNAS

[75] Inventors: Brian Clark, Redding, Conn.; Peter T. Wu, Sugar Land, Tex.; Victor E. Grijalva, Greenwich, Conn.

[73] Assignee: Schlumberger Technology Corporation, Sugar Land, Tex.

[21] Appl. No.: 349,355

[22] Filed: Dec. 2, 1994

[51] Int. Cl.$^6$ .............................. G01V 3/08; G01V 3/10
[52] U.S. Cl. ........................................ 324/338; 324/334
[58] Field of Search .................................... 324/338, 324, 324/332, 333, 334, 335, 337, 339, 344, 345, 346, 340, 341; 73/151, 152; 343/855, 866, 893

[56] References Cited

U.S. PATENT DOCUMENTS

| | | |
|---|---|---|
| 3,305,771 | 2/1967 | Arps . |
| 3,551,797 | 12/1970 | Gouilloud et al. . |
| 3,849,721 | 11/1974 | Calvert . |
| 4,107,597 | 8/1978 | Meador et al. . |
| 4,185,238 | 1/1980 | Huchital et al. . |
| 4,209,747 | 6/1980 | Huchital . |
| 4,278,941 | 7/1981 | Freedman . |
| 4,300,098 | 11/1981 | Huchital et al. . |
| 4,451,789 | 5/1984 | Meador . |
| 4,468,623 | 8/1984 | Gianzero et al. ........................ 324/367 |
| 4,511,843 | 4/1985 | Thoraval . |
| 4,538,109 | 8/1985 | Clark . |
| 4,553,097 | 11/1985 | Clark . |
| 4,567,759 | 2/1986 | Ekstrom et al. ........................ 73/152 |
| 4,622,518 | 11/1986 | Cox et al. . |
| 4,626,785 | 12/1986 | Hagiwara ................................ 324/339 |
| 4,692,706 | 9/1987 | Mazzagatti et al. . |
| 4,730,161 | 3/1988 | Cox et al. . |
| 4,766,384 | 8/1988 | Kleinberg et al. ...................... 324/339 |
| 4,785,247 | 11/1988 | Meador et al. . |
| 4,899,112 | 2/1990 | Clark et al. . |
| 5,081,419 | 1/1992 | Meador et al. . |
| 5,210,495 | 5/1993 | Habashy et al. ........................ 324/338 |
| 5,278,507 | 1/1994 | Bartel et al. ............................ 324/338 |
| 5,345,179 | 9/1994 | Habashy et al. ........................ 324/338 |
| 5,361,239 | 11/1994 | Zoeller . |
| 5,389,881 | 2/1995 | Bittar et al. . |
| 5,434,507 | 7/1995 | Beren et al. ............................ 324/338 |

OTHER PUBLICATIONS

Daev, D. S. "Physical Fundamentals of Electromagnetic Propagation Logging", *Proceedings of Higher Education Institutions, Geology and Survey*, 1970, No. 4, pp. 123–133 (translation from Russian).

Huchital, G. S., R. Hutin, Y. Thoraval, and B. Clark, "The Deep Propagation Tool (A New Electromagnetic Logging Tool)", SPE Paper 10988, presented at 56th Annual Fall Technical Conference and Exhibition, San Antonio, Texas, Oct. 5–7, 1981.

(List continued on next page.)

*Primary Examiner*—Sandra L. O'Shea
*Assistant Examiner*—Roger Phillips
*Attorney, Agent, or Firm*—Martin M. Novack; Wayne I. Kanak

[57] ABSTRACT

An apparatus for determining a property of earth formations surrounding a borehole is presented. In accordance with a particular embodiment, an elongated logging device movable through a borehole is provided with a transmitter array consisting of only first, third, and second transmitting antennas longitudinally spaced on the device. A pair of longitudinally spaced receiving antennas are also provided and are located between the second transmitting antenna and one of the first and third transmitting antennas. In particular, the first, third, and second transmitting antennas are spaced from the midpoint between the receiver pair by first, third, and second distances, respectively, where the first and second distances are substantially the same while being different from the third distance. This antenna arrangement is possible while still providing a borehole compensated output.

55 Claims, 9 Drawing Sheets

OTHER PUBLICATIONS

Rodney, P. F., M. M. Wisler, L. W. Thompson, and R. A. Meador, "The Electromagnetic Wave Resistivity MWD Tool", SPE Paper 12167, presented at 58th Annual Technical Conference and Exhibition, San Francisco, California, Oct. 5–8, 1983.

Coope, Dan, Liang C. Shen and Frank S. C. Huang, "The Theory of 2 MHz Resistivity Tool and Its Application to Measurement–While–Drilling",*The Log Analyst,* May–Jun. 1984, pp. 35–46.

Evans, Hilton B., "EXLOG MWD Resistivity Measurements–A Synopsis of Device Characteristics" EXLOG internal memorandum, Sep. 16, 1986, pp. 5–7.

Rodney, Paul F. and MacMillan M. Wisler, "Electromagnetic Wave Resistivity MWD Tool", *SPE Drilling Engineering,* Oct 1986, pp. 337–346.

Clark, Brian, Martin G. Luling, Jacques Jundt, Mike Ross and David Best, "A Dual Depth Resistivity Measurement for FEWD", SPWLA Twenty–Ninth Annual Logging Symposium, Jun. 5–8, 1988, Paper A.

Clark, B., D. F. Allen, D. Best, S. D. Bonner, J. Jundt, M. G. Luling, and M. O. Ross, "Electromagnetic Propagation Logging While Drilling: Theory and Experiment", SPE Paper 18117 presented at 63rd Annual Technical Conference and Exhibition, Houston, Texas, Oct. 2–5, 1988.

Mack, S. G., P. F. Rodney, M. S. Bittar, "MWD tool accurately measures four resistivities", *Oil and Gas Journal,* May 25, 1992.

Sinclair, Paul, Roland Chemali, and Shey–Min Su, "A new Dual–Spaced Compensated Wave Resistivity Device for Measurement While Drilling" presented at 15th European Formation Evaluation Symposium, May 5–7, 1993, Paper L.

Rodney, P. F., and M. S. Bittar, "A Combined Phase and Amplitude Technique for Controlling the Investigation Depth of Propagating Electromagnetic Wave Resistivity Sensors", SPE Paper 26493 presented at 68th Annual Techincal Conference and Exhibition, Houston, Texas, 3–6 Oct., 1993.

WELL LOGGING APPARATUS AND METHOD WITH BOREHOLE COMPENSATION INCLUDING MULTIPLE TRANSMITTING ANTENNAS ASYMMETRICALLY DISPOSED ABOUT A PAIR OF RECEIVING ANTENNAS

BACKGROUND OF THE INVENTION

1. Field of the Invention

This invention relates to the field of well logging and, more particularly, to well logging techniques and apparatus for determining formation properties, such as resistivity, at several different radial depths of investigation and with compensation for factors such as borehole rugosity and drift of electronic components. The invention has general application in the well logging art, but is particularly useful in measuring while drilling.

2. Description of the Related Art

A commonly used technique for evaluating formations surrounding an earth borehole is resistivity logging. Porous formations having high resistivity generally indicate the presence of hydrocarbons, while porous formations with low resistivity are generally water saturated. However, the region immediately surrounding the borehole can be invaded by borehole fluid or mud filtrate and have a different resistivity than the virgin formation. If a resistivity logging device has only one radial depth of investigation, there is limited ability to measure resistivity of all zones of interest, and there may be difficulty in determining if the measured resistivity represents the invaded zone, the virgin zone, or some combination of the two zones. However, if the resistivity logging device has multiple radial depths of investigation, there is greater flexibility. In addition to the advantage of having, for example, a shallow measurement and a deep measurement individually, the combination of the two can provide additional information such as the extent of invasion. It is also possible to combine two or more measurements, for example a shallow measurement and a deeper measurement, to compute a better estimate of the true formation resistivity.

Wireline resistivity logging tools have long been provided with two or more radial depths of investigation. Conventional wireline resistivity logging tools typically achieve two depths of investigation by using a short and a long vertical array of electrodes or coils. In general, a long vertical array provides a greater radial depth of investigation than does a short vertical array. More recently, as will be discussed momentarily, measuring while drilling tools have been provided with multiple radial depths of investigation.

A type of well logging which is of interest herein is so-called electromagnetic propagation logging, which can be used to measure the resistivity of the formation surrounding a borehole. For example, U.S. Pat. No. 3,551,797 describes a technique wherein electromagnetic energy is transmitted into the formation, and energy which returns to the borehole is measured at a receiver pair to determine the attenuation and/or the phase shift of the electromagnetic energy propagating in the formation. More than one vertical spacing between a transmitter and different receiver pairs may be used to obtain different radial depths of investigation. For example, a receiver pair relatively close to the transmitter can be used to obtain attenuation and/or phase shift information from which the properties of the invaded zone are determined, and measurements of the attenuation and/or phase shift from a receiver pair relatively far from the transmitter can be used to obtain the properties of the deeper uninvaded formations. Either attenuation or phase shift can be used to determine a bulk value of the electromagnetic skin depth for the formation, with the bulk conductivity then being determinable from the electromagnetic skin depth.

Various other techniques also exist in the art for utilizing multiple transmitters and/or receivers to investigate resistivity at different depths of investigation.

In U.S. Pat. No. 4,899,112 there is disclosed a logging apparatus for determining resistivity of formations at two different radial depths of investigation using signals received at only a single receiver pair. The resistivity of formations at a relatively shallow depth of investigation around the receiver pair is determined as a function of the phase shift measured at the receiver pair, and the resistivity of formations at a relatively deep depth of investigation around the receiver pair is determined as a function of the attenuation measured at the receiver pair. The apparatus is particularly advantageous for measurement while-drilling, where it is desirable to obtain resistivity at multiple depths of investigation while minimizing the length and complexity of the logging device. U.S. Pat. No. 4,899,112 also discloses a so-called borehole compensated embodiment, where the receiver pair is located between and equally spaced from, a pair of transmitting antennas that can be alternately energized. The signals received at the receiver pair can be averaged to obtain borehole compensated signals; i.e., signals from which (1) drift of electronic components, and (2) borehole rugosity, have been reduced or removed by cancellation.

One or more additional transmitters can be added to the logging device just described, at different spacing(s), to attain further depths of investigation. However, in order to provide borehole compensation for each additional spacing, it would be necessary to provide two transmitters (one on each side of the receivers) for each such additional spacing.

It is among the objects of the present invention to provide a logging device and technique that determines formation properties at several depths of investigation, with the advantage of borehole compensation and also with minimal use of antennas.

SUMMARY OF THE INVENTION

The apparatus and technique of the present invention provides advantages of borehole compensation without the requirement of having, for each transmitter to receiver pair spacing, an "equal and opposite" transmitter with the same spacing on the other side of the receiver pair.

In one form of the invention, there are provided two transmitting antennas at equal and opposite spacing from the midpoint of the receiving antenna pair, and a third transmitting antenna at a different spacing from the midpoint of the receiving antenna pair, without the need for providing a fourth transmitting antenna to obtain the benefits of borehole compensation. This reduces the complexity and cost of adding additional depths of investigation to a logging tool, while retaining the advantages of borehole compensation.

In another form of the invention, at least three transmitting antennas are provided, with at least one of them on one side of the receiving antenna pair and at least two of them on the other side of the receiving antenna pair. In this embodiment, none of the spacings between respective transmitting antennas and the midpoint of the receiving antenna pair are the same, the spacings preferably differing by at least one inch. Several effective depths of investigation can be obtained, including depths of investigation that do not correspond to a physical spacing between a transmitting antenna and the midpoint of the receiving antenna pair. The advantages of borehole compensation are present for each depth of investigation of the asymmetrical transmitter configuration.

In accordance with one of the above-indicated forms of the invention, there is provided an apparatus for determining a property, such as resistivity, of earth formations surrounding a borehole, that comprises: an elongated logging device movable through the borehole; first, third, and second transmitting antennas longitudinally spaced on the device; a pair of longitudinally spaced receiving antennas on the device, the pair of receiving antennas being located between the second transmitting antenna and one of the first and third transmitting antennas; the first, third, and second transmitting antennas being spaced from the midpoint between the receiver pair by first, third, and second distances, respectively, and the first and second distances being substantially the same; means for energizing the first, third, and second transmitting antennas with electromagnetic energy; means for receiving, at the pair of receiving antennas, electromagnetic energy from the transmitting antennas; means for determining, from electromagnetic energy received at the pair of receiving antennas, first, third, and second phase shift and/or attenuation measurements of electromagnetic energy transmitted from the first, third, and second transmitting antennas, respectively; and means for determining a property of said earth formations from the first, third, and second phase shift and/or attenuation measurements. In one embodiment of this form of the invention, the third distance is smaller than the second distance, and in another embodiment of this form of the invention, the third distance is greater than said second distance. In an illustrated embodiment of this form of the invention, formation resistivity is determined at four borehole compensated depths of investigation.

In accordance with the other above-indicated form of the invention, the first, third, and second transmitting antennas are spaced from the midpoint between the receiving antenna pair by first, third, and second distances, respectively, said first, third, and second distances being different. In this embodiment, the means for determining resistivity includes means for combining at least one weighted measurement of phase shift and/or attenuation of electromagnetic energy from the first or third transmitting antenna, and a weighted measurement of phase shift and/or attenuation of electromagnetic energy from the second transmitting antenna.

Further features and advantages of the invention will become more readily apparent from the following detailed description when taken in conjunction with the accompanying drawings.

DESCRIPTION OF THE PREFERRED EMBODIMENTS

Figure 1:
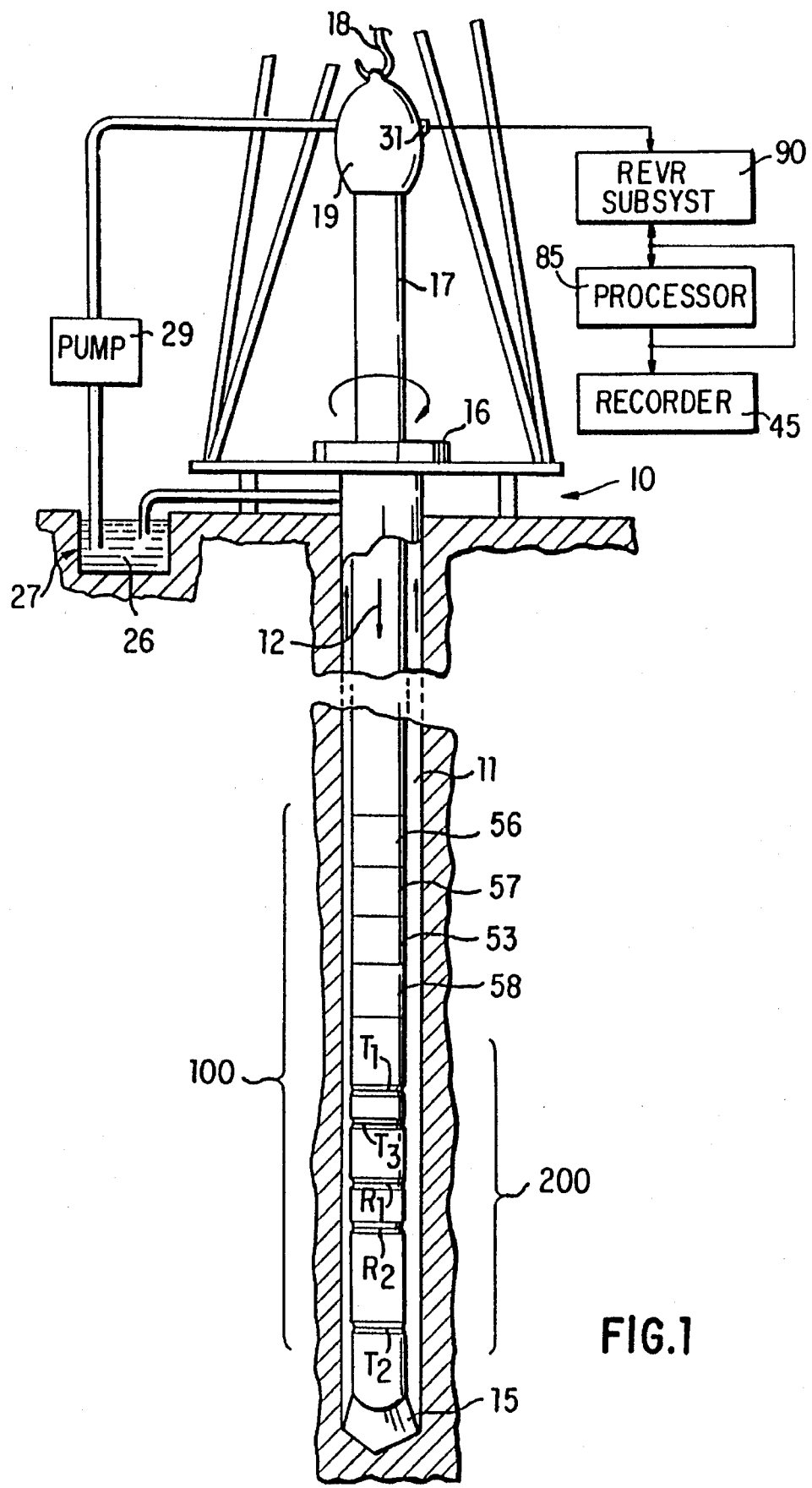
FIG. 1 is a schematic diagram, partially in block form, of a system in accordance with an embodiment of the invention.

Referring to FIG. 1, there is illustrated an embodiment of the invention in the form of a logging-while-drilling apparatus and method. A platform and derrick 10 are positioned over a borehole 11 that is formed in the earth by rotary drilling. A drill string 12 is suspended within the borehole and includes a drill bit 15 at its lower end. The drill string 12, and the drill bit 15 attached thereto, is rotated by a rotating table 16 (energized by means not shown) which engages a kelly 17 at the upper end of the drill string. The drill string is suspended from a hook 18 attached to a travelling block (not shown). The kelly is connected to the hook through a rotary swivel 19 which permits rotation of the drill string relative to the hook. Drilling fluid or mud 26 is contained in a pit 27 in the earth. A pump 29 pumps the drilling fluid into the drill string 12 via a port in the swivel 19 to flow downward through the center of drill string 12. The drilling fluid exits the drill string via ports in the drill bit 15 and then circulates upward in the region between the outside of the drill string and the periphery of the borehole. As is well known, the drilling fluid thereby carries formation cuttings to the surface of the earth, and the drilling fluid is returned to the pit 27 for recirculation. The small arrows in the Figure illustrate the typical direction of flow of the drilling fluid.

Mounted within the drill string 12, preferably near the drill bit 15, is a downhole sensing, processing, storing and transmitting subsystem 100. Subsystem 100 includes a measuring apparatus 200 which includes at least three transmitting antennas $T_1$, $T_2$, and $T_3$, and receiving antennas $R_1$ and $R_2$, and operates in the manner to be described below. [The antennas can be of the type described in the referenced U.S. Pat. No. 4,899,112; that is coils wound on mounting material around a special section of metal drill collar which comprises part of the subsystem 100.] A communications transmitting portion of the downhole subsystem includes an acoustic transmitter 56, which generates an acoustic signal in the drilling fluid that is representative of the measured downhole conditions. One suitable type of acoustic transmitter, which is known in the art, employs a device known as a "mud siren" which includes a slotted stator and a slotted rotor that rotates and repeatedly interrupts the flow of drilling fluid to establish a desired acoustic wave signal in the drilling fluid. The generated acoustic mud wave travels upward in the fluid through the center of the drill string at the speed of sound in the fluid. The acoustic wave is received at the surface of the earth by transducers represented by reference numeral 31. The transducers, which are, for example, piezoelectric transducers, convert the received acoustic signals to electronic signals. The output of the transducers 31 is coupled to the uphole receiver subsystem 90 which is operative to demodulate the transmitted signals, which are then coupled to processor 85 and recorder 45.

Transmitter 56 is controlled by transmitter control and driving electronics 57 which includes analog-to-digital (A/D) circuitry that converts the signals representative of downhole conditions into digital form. The control and driving electronics 57 may also include a suitable modulator, such as a phase shift keying (PSK) modulator, which conventionally produces driving signals for application to the transmitter 56. These driving signals can be used to apply appropriate modulation to the mud siren of transmitter 56. It will be understood that alternative techniques can be employed for communicating logging information to the surface of the earth.

The downhole subsystem 100 further includes acquisition and processor electronics 58. These electronics include a microprocessor (with associated memory, clock circuitry, and interface circuitry), and processing circuitry. The acquisition and processor electronics 58 are coupled to the measuring apparatus 200 and obtain measurement information therefrom. The acquisition and processor electronics is capable of storing data from the measuring apparatus, processing the data and storing the results, and coupling any desired portion of the information it contains to the transmitter control and driving electronics 57 for transmission to the surface by transmitter 56. A battery 53 may provide downhole power. As known in the art, a downhole generator (not shown) such as a so-called "mud turbine" powered by the drilling fluid, can also be utilized to provide power during drilling.

Figure 2:
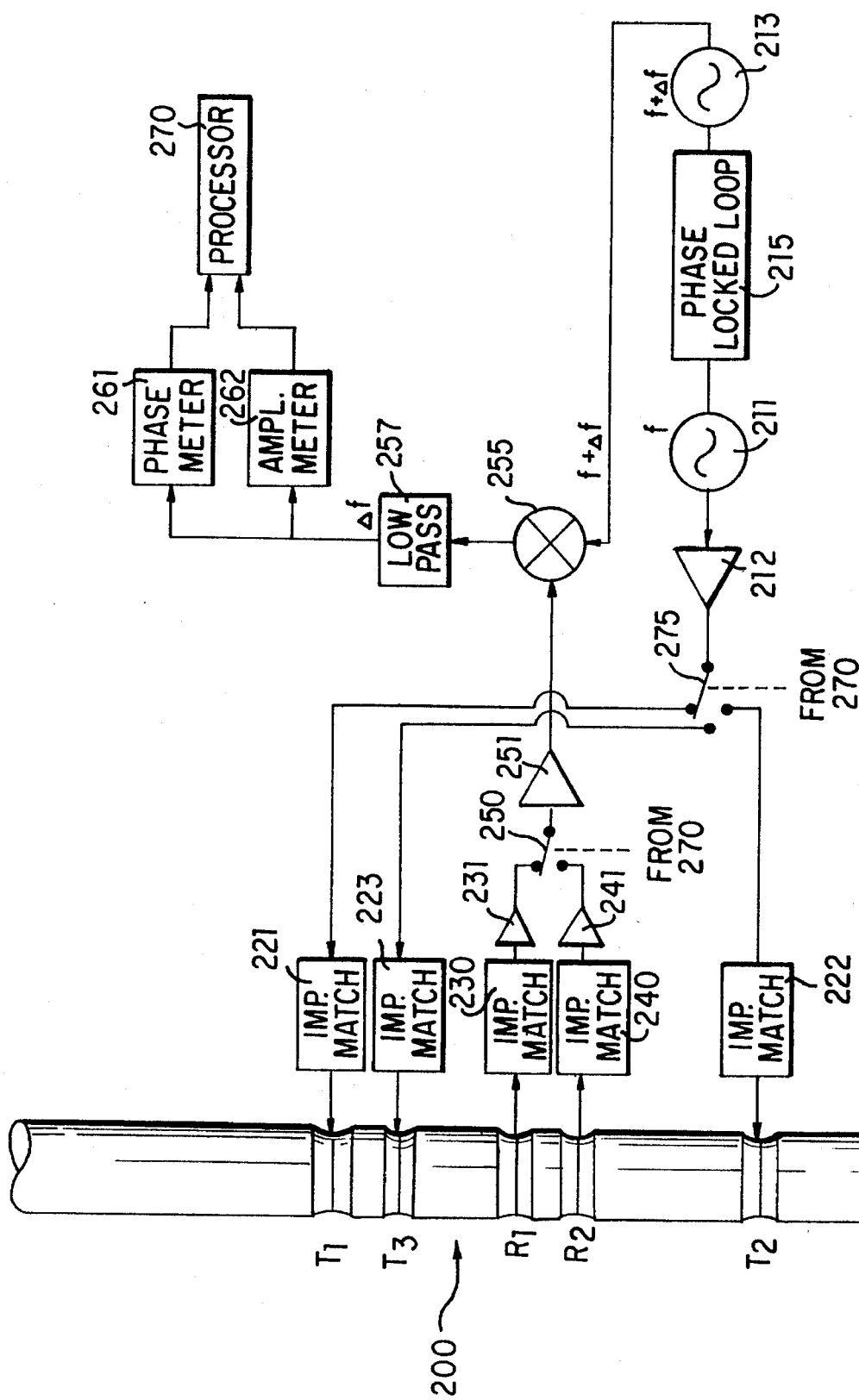
FIG. 2 is a schematic diagram, partially in block form, of an embodiment of the electronics of the FIG. 1 embodiment.

FIG. 2 is a block diagram of electronics in the measuring apparatus 200 and the acquisition and processor electronics 58. An oscillator 211 produces an electrical signal of frequency f [e.g. at 2 MHz], which is amplified by amplifier 212 and applied, via electronically controlled switch 275, to one of the transmitting antennas $T_1$, $T_2$ or $T_3$, through respective impedance matching circuits 221, 222 and 223. The switch 275, under control of the processor 270, selects the transmitter $T_1$, $T_2$, or $T_3$ that is to be energized. The signal from receiver $R_1$ is coupled, via impedance matching circuit 230 and preamplifier 231, to one input of an electronically controlled switch 250. Similarly, the signal from receiver $R_2$ is coupled via impedance matching circuit 240 and preamplifier 241 to the other input of the switch 250. The switch 250, under control of processor 270, selects the ($R_1$) or ($R_2$) receiver output. The selected signal is amplified by amplifier 251 and subsequently translated to a lower frequency $\Delta f$ using a known heterodyne technique. A local oscillator 213 is in a phase locked loop (represented at 215) with the master oscillator 211. The local oscillator 213 has a frequency $f+\Delta f$, where $\Delta f$ is typically a few kilohertz or less. A signal from the local oscillator is mixed with the received signal by a mixer 255, and the mixer output is passed through a low pass filter 257 which blocks signals at $f$ and $f+\Delta f$ and passes the signal at $\Delta f$. The signal at frequency $\Delta f$ contains the phase and amplitude information of the original signal at frequency f. The recognized advantage of this frequency translation is that it is easier to measure the phase and amplitude at kilohertz or lower frequencies than at megahertz frequencies. The signal at frequency $\Delta f$ is measured with a phase meter 261 and with an amplitude meter 262, and the results are input to the processor 270. The phase meter 261 may utilize a reference signal from the phase locked loop 215. The phase and amplitude meters may also include sample-and-hold circuits, to implement comparison of the signal from the respective receivers. Alternatively, the processor may compute the relative phase and amplitude from the measurements it receives. Reference can be made to U.S. Pat. Nos. 4,185,238 and 4,899,112.

As noted above, the processor 270 has associated memory clocking, and interface circuitry (not shown), as is conventional. The processor implements storage of the measurements of phase and amplitude, processing of these measurements in the manner to be described, storage of the results of the processing, and/or coupling of the measurements and/or processing results to the control and driving electronics for transmission to the earth's surface. In the present embodiment, a downhole clock is utilized to keep track of time, which can subsequently be correlated with depth level by virtue of keeping a record of the drill string progress. The clock, which can typically be part of the system in conjunction with the processor 270, can be synchronized with the system before a trip downhole. Also, if desired, communication with the downhole subsystem, using mud pulse technology or other suitable communication means, can be utilized to convey timing synchronization and/or depth level information, as well as to communicate data in general. It will be understood that the invention can be utilized in conjunction with any suitable technique for keeping track of depth level.

With the exception of transmitter $T_3$ and its associated circuitry (and the processing of the signals received therefrom), the FIG. 2 circuit is like that of the borehole compensated embodiment of U.S. Pat. No. 4,899,112. U.S. Pat. No. 4,899,112 describes in detail how resistivity at a relatively deep depth of investigation is obtained from attenuation measured at the receiver pair, and how resistivity at a relatively shallow depth of investigation is obtained from phase shift measured at the receiver pair. As an example, a table look-up can be used for this purpose, and reference can be made to said U.S. Pat. No. 4,899,112 for further detail.

Consider, first, the operation of borehole compensation in the referenced U.S. Pat. No. 4,899,112. When $T_1$ is activated (and $T_2$ off), a downward propagating wave has a phase $P_{1D}$ and an amplitude $A_{1D}$ at the location of receiver $R_1$ and a phase $P_{2D}$ and an amplitude $A_{2D}$ at the location of receiver $R_2$. The true phase shift for the downward propagating wave is $PS=P_{2D}-P_{1D}$, and the true attenuation is $AT=20 \cdot \log_{10}(A_{2D}/A_{1D})$, where $P_{1D}$, $P_{2D}$, $A_1$, and $A_{2D}$ are the phases and amplitudes as measured by an ideal circuit with no phase shift, gain, or offset errors. The actual or measured voltage derived from $R_1$ and input to switch 250 has a net phase $X_{1D}=P_{1D}+P_1$, where $P_1$ is the additional phase increment due to receiver $R_1$, impedance matching circuit 230, and preamplifier 231. The actual or measured voltage derived from $R_1$ and input to switch 250 has an amplitude $B_{1D}=A_1 {}^*A_{1D}$ where $A_1$ is the gain due to receiver $R_1$, impedance matching circuit 230, and preamplifier 231. Similarly, the voltage derived from $R_2$ and input to switch 250 has a net phase $X_{2D}=P_{2D}+P_2$ and an amplitude $B_{2D}=A_2{}^*A_{2D}$, where $P_2$ and $A_2$ are related to receiver $R_2$, impedance matching circuit 240, and preamplifier 241. The rest of the electronics chain (switch 250, amplifier 251, mixer 255, low pass filter 257, phase meter 261, amplitude meter 262, and processor 270) are common to signals from $R_1$ and $R_2$, and do not introduce phase or amplitude differences.

The phase shift of the downward propagating wave, as measured by the electronics, can be expressed as $$PS_{DM}=X_{2D}-X_{1D}=(P_{2D}-P_{1D}) +(P_2-P_1)=PS+(P_2-P_1)=PS+PS_{ERR} \quad (1)$$

and the attenuation of the downward propagating wave as measured by the electronics can be expressed as:

$$AT_{DM} = 20 \cdot \log_{10}(B_{2D}/B_{1D}) = \quad (2)$$
$$20 \cdot \log_{10}(A_{2D}/A_{1D}) + 20 \cdot \log_{10}(A_2/A_1) =$$
$$AT + 20 \cdot \log_{10}(A_2/A_1) = AT + AT_{ERR}.$$

The differences between the two receivers and between the two receiver electronics introduce a phase shift error ($PS_{ERR}=P_2-P_1$) and an attenuation error ($AT_{ERR}=20 \cdot \log_{10}(A_2/A_1)$), which reduce the accuracy of the logging device measurements, particularly for relatively high formation resistivities where variations of PS and AT with respect to resistivity are small. These errors can change with temperature, pressure, borehole mud resistivity, and time.

The inaccuracies which occur in uncompensated measurements are eliminated in the referenced U.S. Pat. No. 4,899,112 with borehole compensation, which is obtained using the second transmitter $T_2$. This can be seen by considering the case with $T_2$ activated and $T_1$ off. The upward propagating wave has phase $P_{1U}$ and amplitude $A_{1U}$ at the location of receiver $R_1$ and a phase $P_{2U}$ and an amplitude $A_{2U}$ at the location of receiver $R_2$. The true phase shift for the upward propagating wave is $PS=P_{1U}-P_{2U}$, and the true attenuation is $AT=20\cdot\log_{10}(A_{1U}/A_{2U})$. These quantities will generally be the same for upward and downward propagating waves. The actual or measured voltage derived from $R_1$ and input to switch 250 has a net phase $X_{1U}=P_{1U}+P_1$ and an amplitude $B_{1U}=A_1*A_{1U}$. The voltage derived from $R_2$ and input to switch 250 has a net phase $X_{2U}=P_{2U}+P_2$ and an amplitude $B_{2U}=A_2*A_{2U}$. The phase shift of the upward propagating wave as measured by the electronics can be expressed as $$PS_{UM}=(X_{1U}-X_{2U})=(P_{1U}-P_{2U})+(P_1-P_2)=PS-PS_{ERR}, \qquad (3)$$

and the attenuation of the upward propagating wave as measured by the electronics can be expressed as $$AT_{UM}=20\cdot\log_{10}(B_{1U}/B_{2U})=20\cdot\log_{10}(A_{1U}/A_{2U})+20\cdot\log_{10}(A_1/A_2)=AT-AT_{ERR} \qquad (4)$$

The errors introduced by the differences in the receivers and receiver electronics have opposite signs for the upward and downward propagating waves and cancel in the borehole compensated quantities $PS_{BHC}$ and $AT_{BHC}$:

$$PS_{BHC}=(PS_{UM}+PS_{DM})/2=PS \qquad (5)$$

$$AT_{BHC}=(AT_{UM}+AT_{DM})/2=AT \qquad (6)$$

Although the above describes the elimination of electronic error, part of the error is due to "path" difference caused by borehole rugosity. Borehole compensation is also known to reduce the effects of borehole rugosity since rugosity causes a difference in the path lengths through the formation to the respective receivers. Without borehole compensation, this difference would cause transient phase shift and attenuation errors.

In accordance with an embodiment of the invention, the transmitter $T_3$ is utilized to obtain two further depths of investigation, and the measurements thereof are borehole compensated, without the need for providing an "equal and opposite" transmitter; i.e., a corresponding transmitter at the same spacing from the receivers as $T_3$, but on the other side of the receivers. Error signals are derived from the measurement obtained using $T_1$ and $T_2$, and are used to correct (or compensate) measurements made with transmitter $T_3$. The error terms for phase shift and attenuation that were obtained when $T_1$ and $T_2$ were active were $$PS_{ERR}=(PS_{UM}-PS_{DM})/2 \qquad (7)$$

$$AT_{ERR}=(AT_{UM}-AT_{DM})/2 \qquad (8)$$

With transmitter $T_3$ activated, and transmitters $T_1$ and $T_2$ off, the downward propagating wave has a phase $P'_{1D}$ and an amplitude $A'_{1D}$ at the location of receiver $R_1$ and a phase $P'_{2D}$ and an amplitude $A'_{2D}$ at the location of receiver $R_2$. The true phase shift for the downward propagating wave is $PS'=P'_{2D}-P'_{1D}$, and the true attenuation is $AT'=20\cdot\log_{10}(A'_{2D}/A'_{1D})$. Because transmitter $T_3$ is closer to the receivers than $T_1$ and $T_2$, PS' and AT' will generally differ from PS and AT. However, the phase shift and attenuation errors introduced by differences between the receivers and the receiver electronics will be unchanged. The voltage derived from $R_1$ and input to switch 250 has a net phase $X'_{1D}=P'_{1D}+P_1$ and an amplitude $B'_{1D}=A_1*A'_{1D}$. Similarly, the voltage derived from $R_2$ and input to switch 250 has a net phase $X'_{2D}=P'_{2D}+P_2$ and an amplitude $B'_{2D}=A_2*A'_{2D}$. The downward phase shift as measured by the electronics is:

$$PS'_{DM}=X'_{2D}-X'_{1D}=(P'_{2D}-P'_{1D})+(P_2-P_1)=PS'+PS_{ERR}, \qquad (9)$$

and the downward attenuation as measured by the electronics is:

$$AT_{DM} = 20\cdot\log_{10}(B'_{2D}/B'_{1D}) = \qquad (10)$$
$$20\cdot\log(A'_{2D}/A'_{1D}) + 20\cdot\log_{10}(A_2/A_1) = AT' + AT_{ERR}.$$

These quantities can be corrected by subtracting $PS_{ERR}$ and $AT_{ERR}$ as measured by $T_1$ and $T_2$. That is, the corrected phase shift for $T_3$ will be $$PS'_c=PS'_{DM}-PS_{ERR}=PS', \qquad (11)$$

and the corrected attenuation will be $$AT'_c=AT'_{DM}-AT_{ERR}=AT'. \qquad (12)$$

Figure 3:
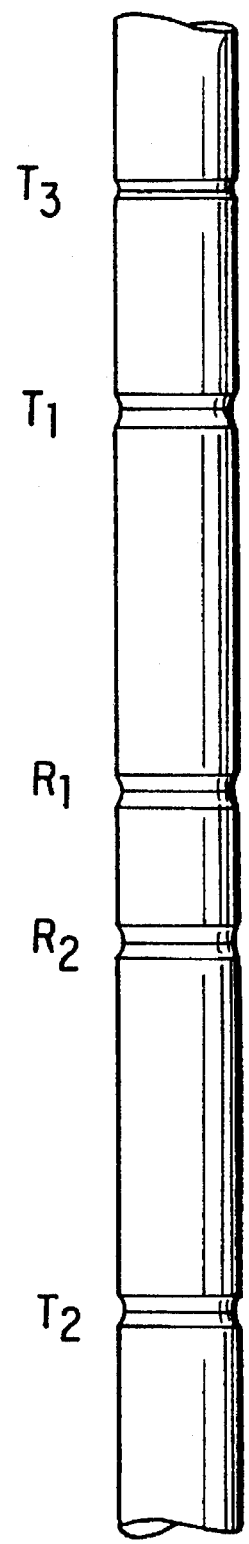
FIG. 3 illustrates a variation of the FIG. 2 embodiment.

Thus, when these corrected measurements are generated, it is not necessary to add a fourth transmitter to obtain the benefits of borehole compensation, including correction for electronics errors and correction for borehole rugosity. This technique reduces the complexity and cost of adding additional depths of investigation to the logging tool, while retaining the advantages of borehole compensation. Significant further advantage is obtained for the situation when $T_3$ is placed above $T_1$, as shown in FIG. 3. [Processing will be the same as just described.] In this case, the tool length must only be increased by approximately the distance between $T_1$ and $T_3$. In a conventionally borehole compensated long array, the tool length would have to be increased by twice such distance. It will be understood that further transmitters can be added, consistent with the principles set forth.

Figure 4A:
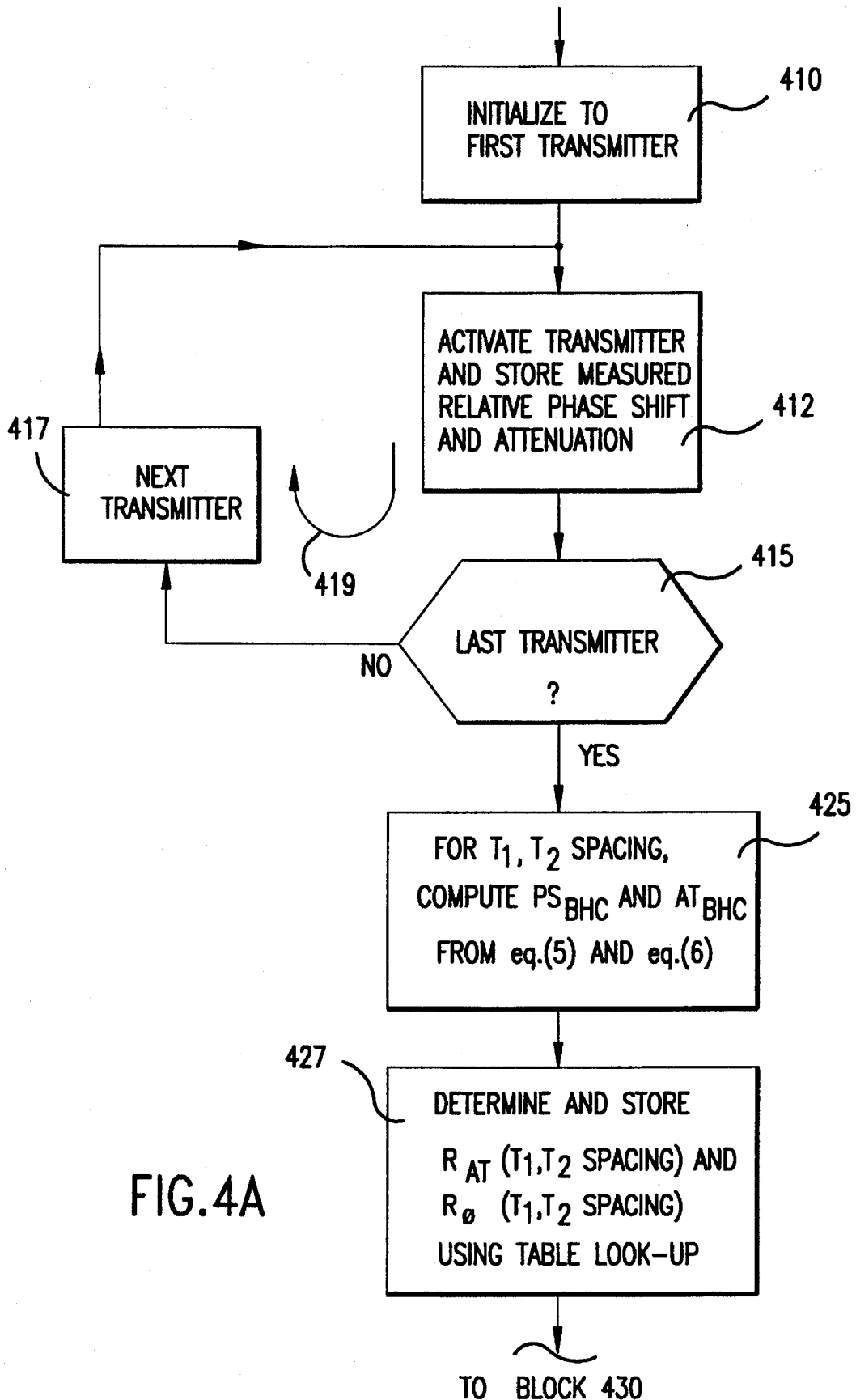
FIGS. 4A and 4B are flow diagrams of a routine for controlling a processor in practicing the embodiment of FIG. 2 or 3.
Figure 4B:
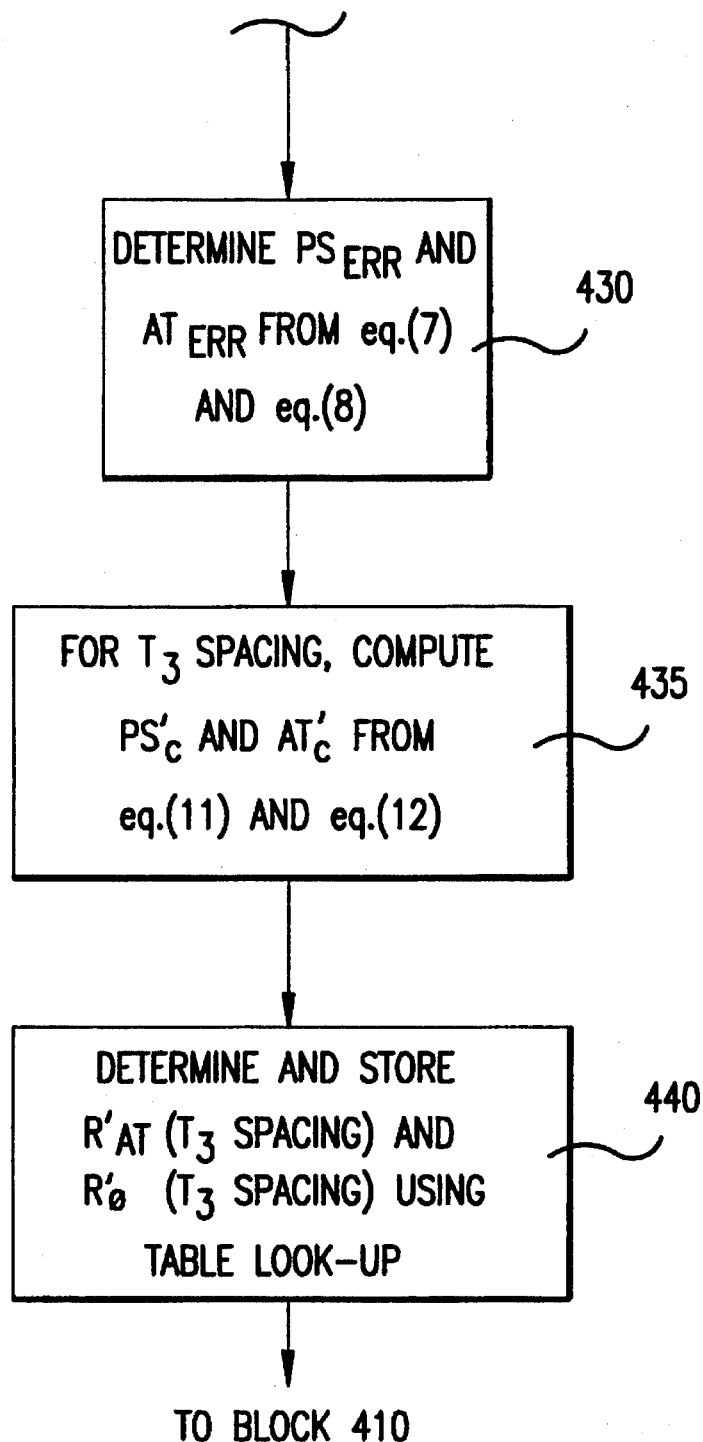

Referring to FIGS. 4A and 4B, there is shown a flow diagram of a routine for controlling the processor 270 in accordance with an embodiment of the invention for obtaining borehole compensated resistivity from attenuation and borehole compensated resistivity from phase shift for the spacing of transmitters $(T_1, T_2)$, and also for the spacing of transmitter $T_3$. The block 410 represents initializing of a transmitter index to the first transmitter $(T_1)$. The transmitter is activated, and the relative phase shift and attenuation are measured and stored, as represented by the block 412. Inquiry is then made (decision block 415) as to whether the last transmitter index has been reached. If not, the transmitter index is incremented (block 417), block 412 is re-entered, and the loop 419 is continued until measurements have been made and stored for each of the three transmitters $(T_1, T_2,$ and $T_3$, for the present embodiment). The block 425 is then entered, and, for the $T_1, T_2$ spacing, borehole compensated phase shift $[PS_{BHC}]$ and attenuation $[AT_{BHC}]$ are computed using equation (5) and equation (6). These measured values can then be used to determine and store (block 427) the resistivity from attenuation $[R_{AT}]$ and the resistivity from phase shift $[R_\phi]$ at the spacing of $T_1, T_2$. This determination can be made, for example, in accordance with the teachings of U.S. Pat. No. 4,899,112, by using the table look-up technique described in detail therein. [As noted in U.S. Pat. No. 4,899,112, the look-up table can take into account dielectric constant, which can be treated as a function of conductivity.] The block 430 is then entered, and the phase shift error $[PS_{ERR}]$ and the attenuation error $[AT_{ERR}]$ are determined from equation (7) and equation (8), respectively. Then, in accordance with a feature of the invention, and as represented by the block 435, the corrected (that is, pseudo borehole compensated) phase shift $[PS_c']$ and attenuation $[AT_c']$, for the $T_3$ spacing are computed from equation (11) and equation (12). The same type of table look-up technique can then be used (block 440) to determine and store the resistivity from attenuation $[R'_{AT}]$ and the resistivity from phase shift $[R'_\phi]$ at the $T_3$ spacing. Thus, using the configuration of FIG. 2 (or FIG. 3), resistivity can be determined, with borehole compensation, at four effective depths of investigation [namely, $R_{AT}$ for the $T_1$, $T_2$ spacing, $R_\phi$ for the $T_1$, $T_2$ spacing, $R'_{AT}$ for the $T_3$ spacing, and $R'_\phi$ for the $T_3$ spacing]. The block 410 can then be re-entered for processing at further depth levels.

Figure 5:
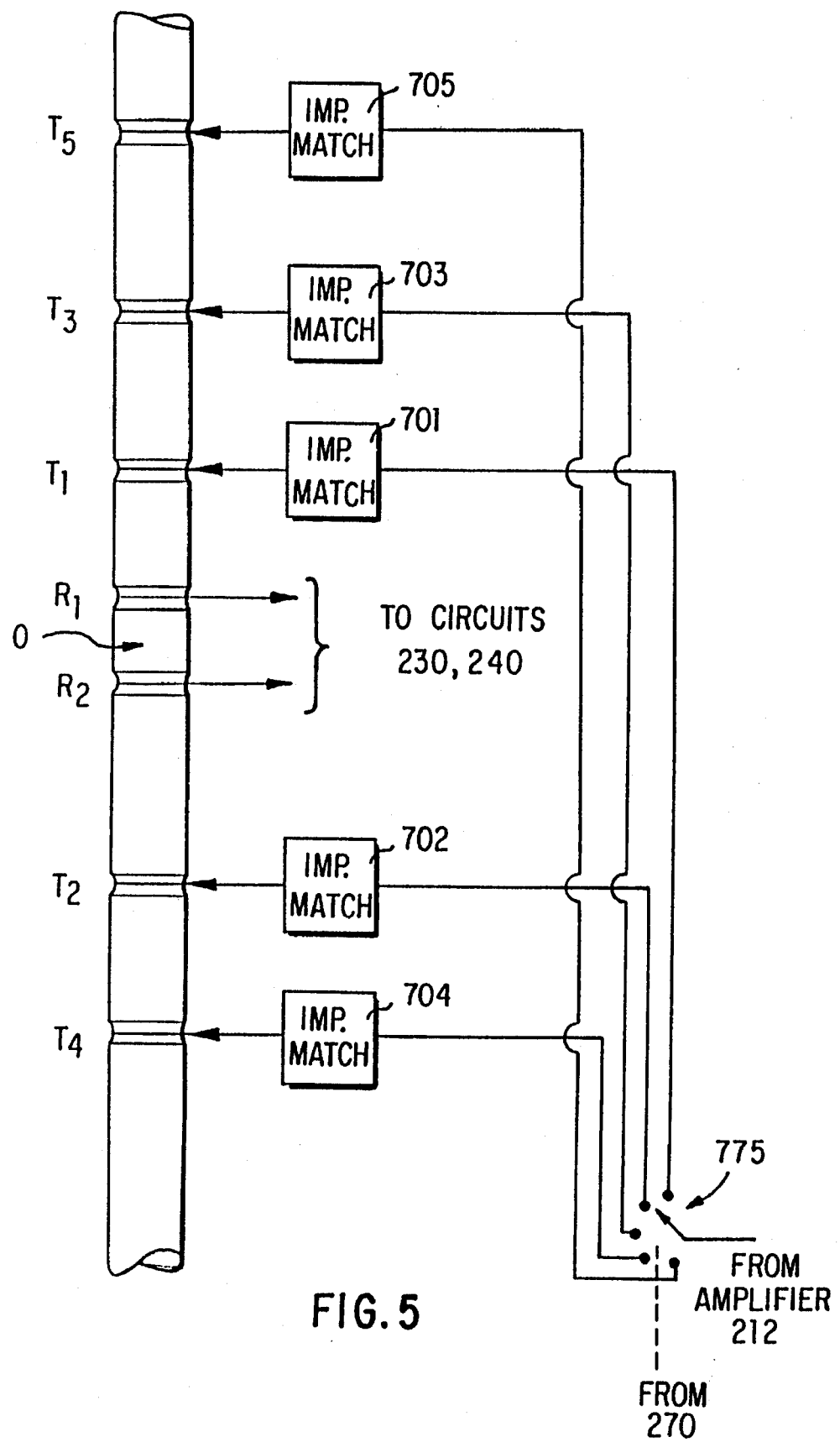
FIG. 5 illustrates a logging device with five transmitting antennas in accordance with a further embodiment of the invention.

Referring to FIG. 5, there is shown a further embodiment of the invention, which may be employed, for example, as the logging device 200 of the measuring while drilling equipment illustrated in FIG. 1. The embodiment of FIG. 5 has a receiver pair comprising receiving antennas $R_1$, $R_2$, and five transmitting antennas, $T_1$, $T_2$, $T_3$, $T_4$, and $T_5$. The transmitting antennas $T_1$, $T_3$, and $T_5$ are above the receiver antennas, and the transmitting antennas $T_2$ and $T_4$ are below the receiving antennas. The spacings of the transmitting antennas, with respect to the midpoint of the receiving antennas, (0), are all different. As one example, the spacing between receiving antennas $R_1$ and $R_2$ may be 6 inches, and the spacing from the receiver midpoint to each transmitter $T_1$ through $T_5$ may be 10 inches, 16 inches, 22 inches, 28 inches, and 34 inches, respectively. Each transmitter can be individually energized (for example, on a time multiplexed or a frequency multiplexed basis), and a relative phase shift measurement and an attenuation measurement can be determined from the signals received at the receiving antennas, for electromagnetic energy transmitted from each of the transmitting antennas $T_1$ through $T_5$. The electronics for the FIG. 5 embodiment can be similar to that of the FIG. 3 embodiment. In this case, electronic switch 775 receives the signal from amplifier 212, and couples the signal to a selected one of the transmitting antennas $T_1$, $T_2$, $T_3$, $T_4$ or $T_5$, via impedance matching circuits 701, 702, 703, 704 or 705, under control of a signal from processor 270. The processor can energize the transmitting antennas in any desired order, for example, sequentially. The routine of FIG. 8 (to be described below) can be used to program the processor 270 to control the energizing of the transmitting antennas and the storing and processing of relative phase shift and attenuation measurements from the receiving antennas.

Figure 6:
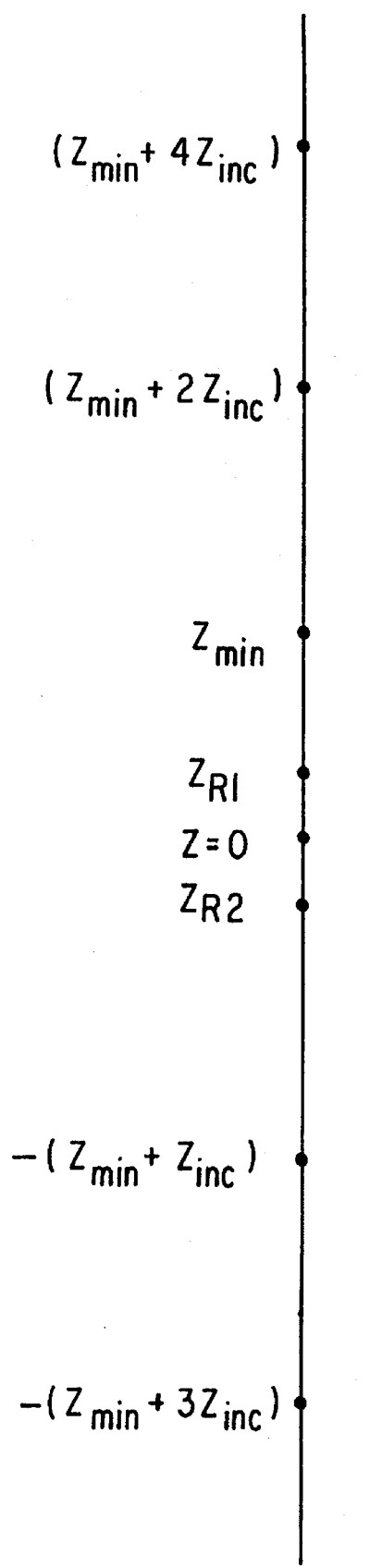
FIG. 6 is a diagram which illustrates the placement of antennas in accordance with a further embodiment of the invention.

Before further describing the processing of the received signals of the FIG. 5 embodiment, consider the general case of FIG. 6, which illustrates a Z-axis (which can be a tool axis), with Z=0 being at the midpoint of receiving antenna locations represented by dots at $Z_{R1}$ and $-Z_{R2}$, where $Z_{R1}=Z_{R2}$. Transmitting antennas are located along the Z axis, with the i-th transmitter, $Z_i$, at:

$$Z_i=(-1)^{i-1}\cdot[Z_{min}+(i-1)\cdot Z_{inc}], i=1,2,3,\ldots,n \quad (13)$$

where $Z_{min}$ is the spacing of the closest transmitter, $Z_{inc}$ is the spacing increment (preferably at least one inch), and n is an integer that is at least 3. Accordingly, as seen in FIG. 6, the transmitters will be located at $Z_1=Z_{min}$, $Z_2=-(Z_{min}+Z_{inc})$, $Z_3=(Z_{min}+2Z_{inc})$, $Z_4=-(Z_{min}+3Z_{inc})$, $Z_5=(Z_{min}+4Z_{inc})$, etc.

Figure 7:
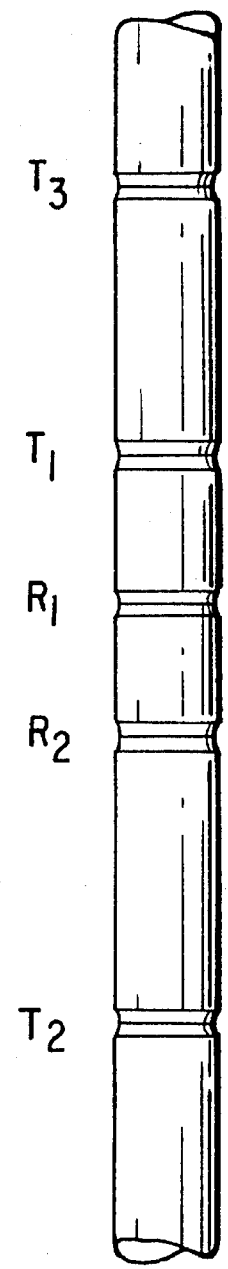
FIG. 7 illustrates another logging device with three transmitters in accordance with a further embodiment of the invention.

A three transmitter device with transmitters at $Z_1=Z_{min}$, $Z_2=-(Z_{min}+Z_{inc})$ and $Z_3=(Z_{min}+2Z_{inc})$ is illustrated in FIG. 7. In an illustrative example, the receivers are spaced 6 inches apart ($Z_{R1}=-Z_{R2}=3$ inches), $Z_{min}$ is 10 inches, and $Z_{inc}$ is 6 inches. This means that the transmitter positions with respect to the receiver midpoint, for this example, are at $Z_1=10$ inches, $Z_2=-16$ inches, and $Z_3=22$ inches. The electronics coupled with the transmitting and receiving antennas can be of the same type shown in FIG. 2, except that the determinations of borehole compensated relative phase shift and attenuation are determined by processor 270 from the measured values in a manner to be described. For example, six effective depths of investigation (from three physical TR spacings), each with borehole compensation, can be obtained using the configuration of FIG. 7 and applying appropriate weightings of the relative phase shift and/or attenuation measurements associated with each transmitter. If the relative phase shift or the attenuation measured at the receiving antennas when the transmitter $T_i$ is active is designated X(i), the following equivalent spacings, which illustrate the different types of borehole compensation, can be obtained:

1) Equivalent TR Spacing of 10 Inches $$X \text{ (e.g. 10 inch)}=0.75\cdot X(1)+0.5\cdot X(2)-0.25\cdot X(3) \quad (14)$$

The weighted mixing of measurements (relative phase shift or attenuation) for this type of case is referred to herein as "mix-pseudo", and has some similarity to the embodiment of FIG. 2 or 3 (where $T_1$ and $T_2$ are symmetrically spaced, whereas here they are not), in that an imbalance function type of correction is used in obtaining borehole compensation. This type of mixing produces an asymmetric response to a thin bed, in varying degrees, depending on the spacing between transmitters and receivers. The response is more asymmetric for shorter spacings and less asymmetric for longer spacings.

2) Equivalent TR Spacing of 13 Inches $$X \text{ (eg. 13 inch)}=0.5\cdot X(1)+0.5\cdot X(2) \quad (15)$$

The weighted (even weightings in this instance) mixing of measurements for this type of case is referred to herein as "mix-asymmetric". The depth of investigation substantially corresponds to the average of the two components spacings TR (10 inches and 16 inches, for this example), and borehole compensation is again achieved. There is no physical sensor at the equivalent TR spacing (13 inches, in this example), and the result is an interpolated one. This type of mixing also produces an asymmetric response to a thin bed, although the degree of asymmetry is less than that of the previously described mix-pseudo type.

3) Equivalent TR Spacing of 16 Inches $$X \text{ (eg. 16 inch)}=0.25\cdot X(1)+0.5\cdot X(2)+0.25\cdot X(3) \quad (16)$$

The weighted mixing of measurements for this type of case is referred to herein as "mix-symmetric". This type of mixing produces a symmetric response, with borehole compensation, at the equivalent TR spacing that has a physical sensor (at 16 inches, in this example).

Table 1 shows, for the general case of up to n transmitters, the equivalent TR spacing, the mixing type, and the preferred weighting coefficients. A continuum of effective TR spacings may be obtained by adjusting the weighting factors of each measurement subject to the constraints that the sum of the weighting factors of the positive spacings should equal the sum of the weighting factors of the negative spacings, and the sum of all the factors should equal unity. However, the number of independent spacings is only equal to the number of transmitters at different spacings.

TABLE 1

| Equivalent TR spacing | type | weighting coefficients |
|---|---|---|
| Zmin | mix-psuedo | $0.75 \cdot X(1) + 0.5 \cdot X(2) - 0.25 \cdot X(3)$ |
| Zmin + 0.5 · Zinc | mix-asym. | $0.5 \cdot X(1) + 0.5 \cdot X(2)$ |
| Zmin + Zinc | mix-sym. | $0.25 \cdot X(1) + 0.5 \cdot X(2) + 0.25 \cdot X(3)$ |
| ... | ... | ... |
| Zmin + m · Zinc | mix-sym. | $0.25 \cdot X(m) + 0.5 \cdot X(m+1) + 0.25 \cdot X(M+2)$ |
| ... | ... | ... |
| Zn − Zinc | mix-sym. | $0.25 \cdot X(n-2) + 0.5 \cdot X(n-1) + 0.25 \cdot X(n)$ |
| Zn − 0.5 · Zinc | mix-asym. | $0.5 \cdot X(n-1) + 0.5 \cdot X(n)$ |
| Zn | mix-psuedo | $0.75 \cdot X(n) + 0.5 \cdot X(n-1) - 0.25 \cdot X(n-2)$ |

Other combinations and weighting coefficients can be used, including, for example, a combination of measurements obtained from using four or more of the transmitters. For a particular combination, the measurements from transmitters not involved in the computation have weightings of zero. Accordingly, the general formula for a particular spacing will be $$X = w_1 \cdot X(1) + w_2 \cdot X(2) + w_3 \cdot X(3) + \ldots w_n \cdot X(n) \quad (17)$$

where n is the number of transmitters, and $w_1, w_2, w_3 \ldots w_n$ are weighting coefficients that can have positive, negative, or zero values, preferably subject to the above-indicated constraints. Reference can then again be made to the embodiment of FIG. 5, with five transmitters at the indicated spacings: 10 inches, 16 inches, 22 inches, 28 inches and 34 inches [which, as above, results from the transmitter placement equation (13), with $Z_{min}=10$ inches and $Z_{inc}=6$ inches]. Table 2 shows equivalent TR spacings that can be obtained with the FIG. 5 embodiment, the mixing types, the preferred weighting coefficients, and whether or not a physical sensor is present at each equivalent TR spacing. In this case only a maximum of five spacings are independent. The others are "dependent" spacings which can be linearly derived from combinations of measurements from the independent spacings. It will be understood that, if desired, weightings can be varied while operating downhole, either automatically or under operator control when communications capability is present.

TABLE 2

| Equivalent TR spacing | type | weighting coefficients | physical sensor |
|---|---|---|---|
| 10" | mix-psuedo | $0.75 \cdot X(1) + 0.5 \cdot X(2) - 0.25 \cdot X(3)$ | Yes |
| 13" | mix-asym. | $0.5 \cdot X(1) + 0.5 \cdot X(2)$ | No |
| 16" | mix-sym. | $0.25 \cdot X(1) + 0.5 \cdot X(2) + 0.25 \cdot X(3)$ | Yes |
| 22" | mix-sym. | $0.25 \cdot X(2) + 0.5 \cdot X(3) + 0.25 \cdot X(4)$ | Yes |
| 28" | mix-sym. | $0.25 \cdot X(3) + 0.5 \cdot X(4) + 0.25 \cdot X(5)$ | Yes |
| 31" | mix-asym. | $0.5 \cdot X(4) + 0.5 \cdot X(5)$ | No |
| 34" | mix-psuedo | $0.75 \cdot X(5) + 0.5 \cdot X(4) - 0.25 \cdot X(3)$ | Yes |

It is seen that in the embodiment of FIG. 5, fourteen different depths of investigation (one attenuation-based and one phase shift-based, for each of seven equivalent TR spacings) can be obtained, with borehole compensation, using the indicated preferred weightings.

Figure 8A:
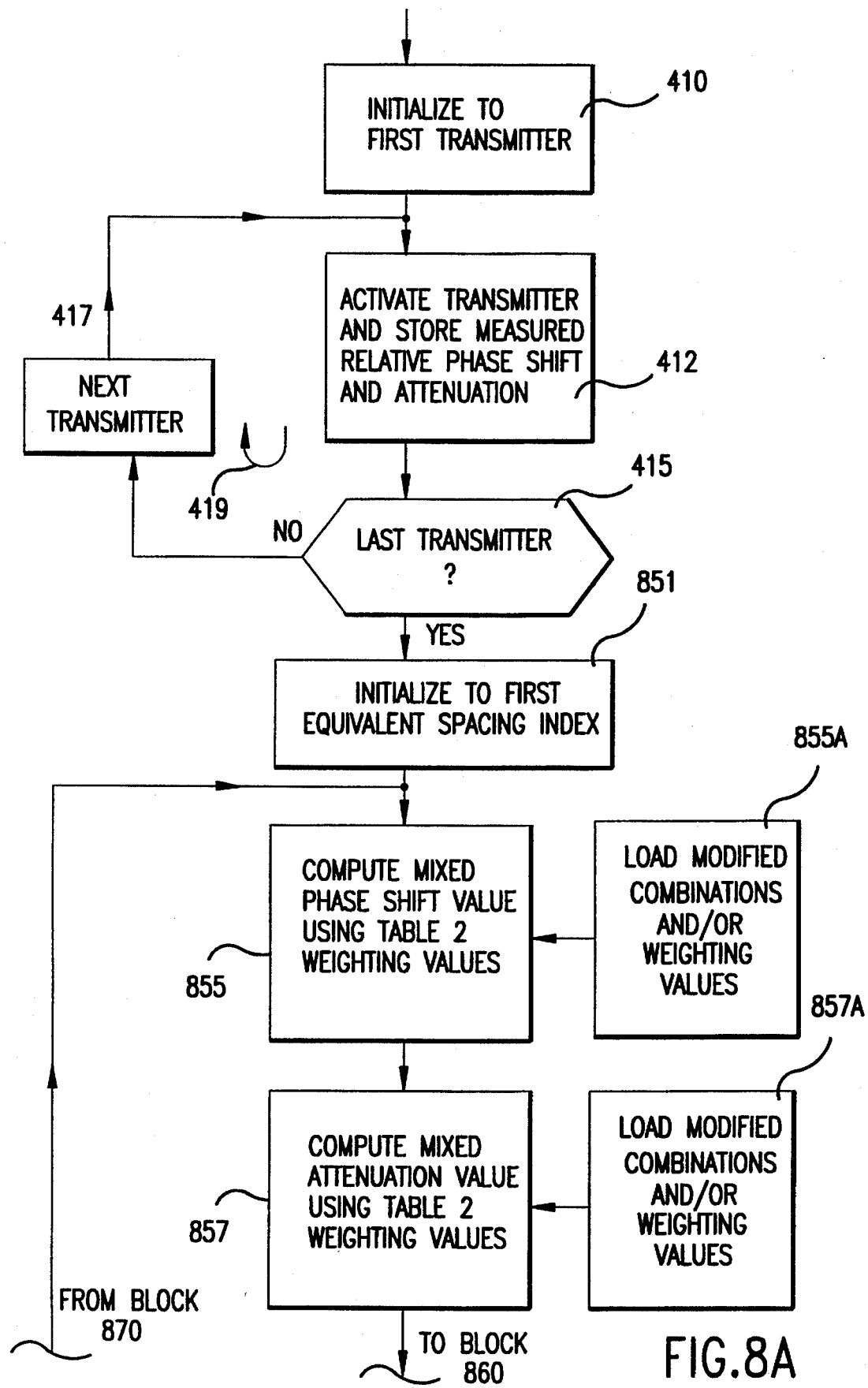
FIGS. 8A and 8B are flow diagrams of a routine for controlling a processor in accordance with a further embodiment of the invention.
Figure 8B:
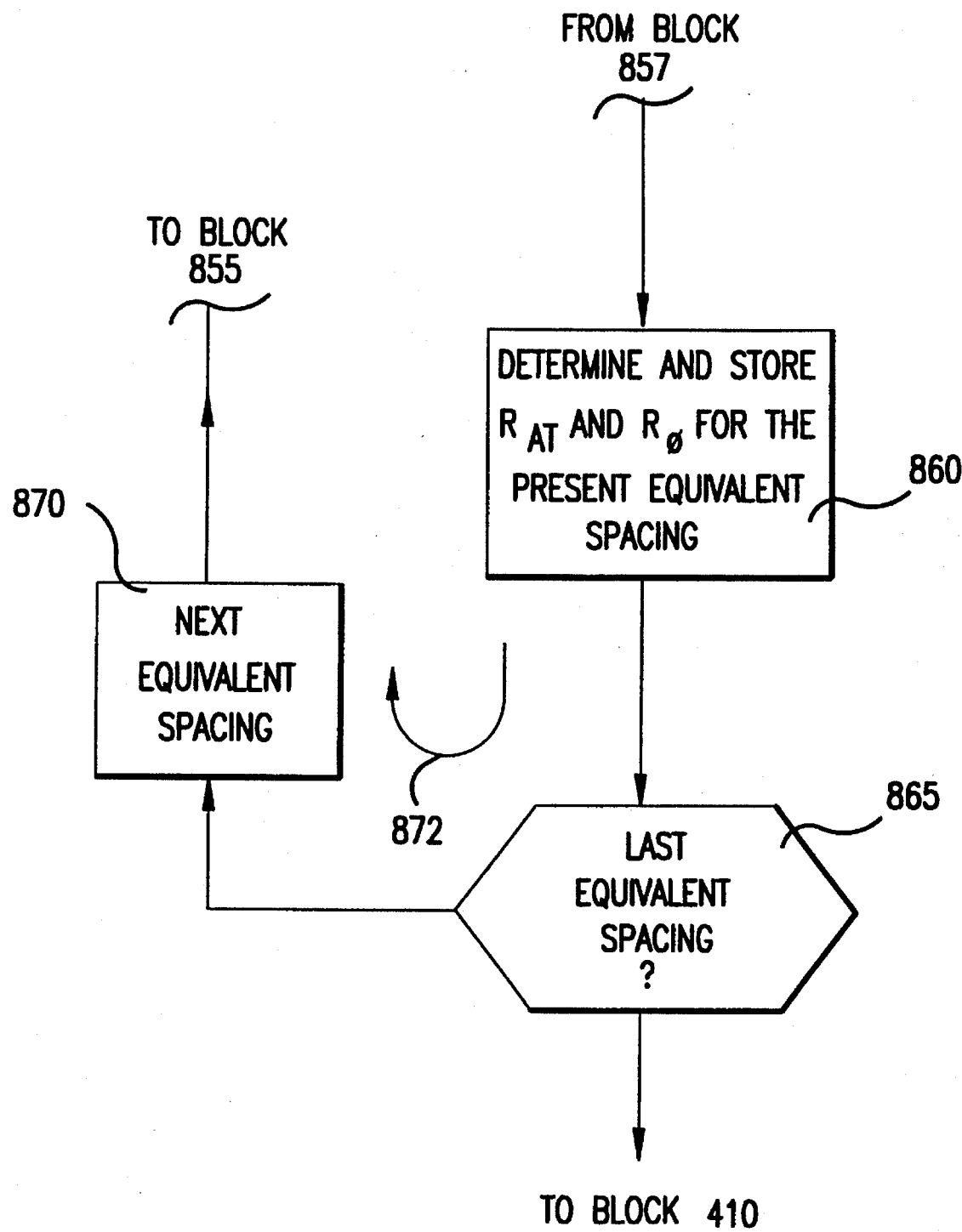

Referring to FIG. 8, there is shown a flow diagram of a routine for controlling a processor (e.g. 270 of FIG. 2) of the FIG. 5 embodiment, with five transmitters, in accordance with an embodiment of the invention. [The same type of routine can be used for any number of transmitters.] The blocks 410, 412, 415, and 417, and the loop 419 operate as described in FIG. 4, to sequentially cause energizing of each transmitter ($T_1$ through $T_5$, in this case), and to measure and store the relative phase shift and attenuation of the received signals, associated with each transmitting antenna. The block 851 is then entered, this block representing the initializing of an equivalent spacing index to the first equivalent spacing of the Table 2; namely, the equivalent spacing of 10 inches. The mixed phase shift value is then computed (block 855) using the Table 2 weighting values. Also, the mixed attenuation value is computed, again, using the Table 2 weighting values (block 857). [The blocks 855A and 857A represent loading of modified combinations and/or weighting values, for situations where it is desirable to change and/or add combinations and/or weighting values.] The block 860 is then entered, this block representing, again, use of the table look-up to determine and store the resistivity from attenuation [$R_{AT}$] and the resistivity from phase shift [$R_\phi$] for the present spacing. A determination is then made (decision block 865) as to whether the last equivalent spacing index has been reached. [In this case, that would be the equivalent spacing of 34 inches.] If not, the equivalent spacing index is incremented (block 870), and the block 855 is re-entered. The loop 872 is then continued until the attenuation-based resistivity [$R_{AT}$] and the phase shift-based resistivity [$R_\phi$] have been computed for each equivalent spacing. The block 410 can then be re-entered for processing of subsequent depth levels. In all, for the example of this embodiment, borehole compensated resistivity can be obtained at fourteen depths of investigation; namely, two depths of investigation [$R_{AT}$ and $R_\phi$] for each of seven equivalent spacings.

The invention has been described with regard to particular preferred embodiments, but variations within the spirit and scope of the invention will occur to those skilled in the art. For example, it will be understood that properties of earth formations, such as vertical and horizontal resistivity and dielectric constant, can be determined. Also, further receiving antennas can be used. Finally, while the invention is well suited for measurement-while-drilling application, it can also be applied in wireline logging when the drill string is removed from the borehole.

We claim:

1. Apparatus for determining a property of earth formations surrounding a borehole, comprising:

an elongated logging device movable through the borehole;

a transmitter array consisting of only first, third, and second transmitting antennas longitudinally spaced on said device;

a pair of longitudinally spaced receiving antennas on said device, said pair of receiving antennas being located between said second transmitting antenna and one of said first and third transmitting antennas;

said first, third, and second transmitting antennas being spaced from the midpoint between said receiver pair by first, third, and second distances, respectively, said first and second distances being substantially the same and being different from said third distance;

means for energizing said first, third, and second transmitting antennas with electromagnetic energy;

means for receiving, at said pair of receiving antennas, electromagnetic energy from said transmitting antennas;

means for determining, from electromagnetic energy received at said pair of receiving antennas, first, third, and second phase shift and/or attenuation measurements of electromagnetic energy transmitted from said first, third, and second transmitting antennas, respectively; and means for determining a property of said earth formations from said first, third, and second phase shift and/or attenuation measurements.

2. Apparatus as defined by claim 1, wherein said third distance is smaller than said second distance.

3. Apparatus as defined by claim 1, wherein said third distance is greater than said second distance.

4. Apparatus as defined by claim 1, wherein said property is resistivity.

5. Apparatus as defined by claim 1, wherein said property is resistivity at four borehole compensated depths of investigation, and wherein said phase shift and/or attenuation measurements comprise phase shift and attenuation measurements.

6. Apparatus as defined by claim 5, wherein resistivity at two of said borehole compensated depths of investigation are respectively determined from an average of phase shift measurements of electromagnetic energy from said first and second transmitting antennas, and an average of attenuation measurements of electromagnetic energy from said first and second transmitting antennas, and wherein resistivity at the other two of said borehole compensated depths of investigation are trespectively determined from the phase shift measurement of electromagnetic energy from said third transmitting antenna compensated by phase shift measurements of electromagnetic energy from said first and second transmitting antennas, and from the attenuation measurement of electromagnetic energy from said third transmitting antenna compensated by attenuation measurements of electromagnetic energy from said first and second transmitting antennas.

7. Apparatus as defined by claim 6, wherein resistivity at said other two borehole compensated depths of investigation are respectively determined from the phase shift measurement of electromagnetic energy from said third transmitting antenna, compensated by an error value that depends on the difference between the phase shift measurements of electromagnetic energy from said first and second transmitting antennas, and from the attenuation measurement of electromagnetic energy from said third transmitting antenna, compensated by an error value that depends on the difference between the attenuation measurements of electromagnetic energy from said first and second transmitting antennas.

8. Apparatus as defined by claim 7, wherein said logging device is mounted in a drill string for logging while drilling operation.

9. Apparatus as defined by claim 8, wherein said transmitting antennas are energized in sequence.

10. Apparatus as defined by claim 8, wherein said transmitting and receiving antennas are coils wound on a generally cylindrical drill collar.

11. Apparatus for determining a property of earth formations surrounding a borehole, comprising:

an elongated logging device movable through the borehole;

first, third, and second transmitting antennas longitudinally spaced on said device;

a pair of longitudinally spaced receiving antennas on said device, said pair of receiving antennas being located between said second transmitting antenna and one of said first and third transmitting antennas;

said first, third, and second transmitting antennas being spaced from the midpoint between said receiver pair by first, third, and second distances, respectively, said first, second, and third distances being different;

means for energizing said first, third, and second transmitting antennas with electromagnetic energy;

means for receiving, at said pair of receiving antennas, electromagnetic energy from said transmitting antennas;

means for determining, from electromagnetic energy received at said pair of receiving antennas, first, third, and second phase shift and/or attenuation measurements of electromagnetic energy transmitted from said first, third, and second transmitting antennas, respectively; and means for determining a property of said earth formations from said first, third, and second phase shift and/or attenuation measurements.

12. Apparatus as defined by claim 11, wherein said first, third, and second distances each differ by at least 1 inch.

13. Apparatus as defined by claim 11, wherein said property is resistivity.

14. Apparatus as defined by claim 13, wherein said means for determining resistivity includes means for combining at least one weighted measurement of phase shift and/or attenuation of electromagnetic energy from said first or third transmitting antenna, and a weighted measurement of phase shift and/or attenuation of electromagnetic energy from said second transmitting antenna.

15. Apparatus as defined by claim 14, wherein said at least one weighted measurement of phase shift and/or attenuation of electromagnetic energy from said first or third transmitting antenna comprises weighted measurements of phase shift and/or attenuation of electromagnetic energy from each of said first and third transmitting antennas.

16. Apparatus as defined by claim 14, wherein said means for determining resistivity comprises means for determining borehole compensated resistivity at several radial depths of investigation.

17. Apparatus as defined by claim 14, wherein said logging device is mounted in a drill string for logging while drilling operation.

18. Apparatus as defined by claim 16, wherein said transmitting antennas are energized in sequence.

19. Apparatus as defined by claim 17, wherein said transmitting and receiving antennas are coils wound on a generally cylindrical drill collar.

20. Apparatus for determining a property of earth formations surrounding a borehole, comprising:

an elongated logging device movable through the borehole;

said device having a longitudinal coordinate Z-axis with a reference coordinate point designated Z=0, a pair of receiving antennas at $Z_{R1}$ and $-Z_{R2}$, where distances $Z_{R2}$ and $Z_{R1}$ are equal, and transmitting antennas at $$Z_i = (-1)^{i-1} \cdot [Z_{min} + (i-1) \cdot Z_{inc}]$$

for each of i=1, 2, ... n, where n is at least 3, and $Z_{min} > Z_{R1}$;

means for energizing each of said transmitting antennas with electromagnetic energy;

means for receiving, at said pair of receiving antennas, electromagnetic energy from each of said transmitting antennas;

means for determining, from electromagnetic energy received at said pair of receiving antennas, phase shift and/or attenuation measurements of electromagnetic energy transmitted from each of the respective transmitting antennas; and means for determining a property of said earth formations from said phase shift and/or attenuation measurements.

21. Apparatus as defined by claim 20, wherein $Z_{inc}$ is at least 1 inch.

22. Apparatus as defined by claim 20, wherein said property is resistivity.

23. Apparatus as defined by claim 22, wherein said means for determining resistivity includes means for combining at least one weighted measurement of phase shift and/or attenuation of electromagnetic energy from a transmitting antenna at a positive coordinate position on the Z-axis of said device and at least one weighted measurement of phase shift and/or attenuation of electromagnetic energy from a transmitting antenna at a negative coordinate position on the Z-axis of said device.

24. Apparatus as defined by claim 23, wherein said at least one weighted measurement of phase shift and/or attenuation of electromagnetic energy from a transmitting antenna at a positive coordinate position on the Z-axis of said device comprises two weighted measurements.

25. Apparatus as defined by claim 24, wherein one of said weightings has a negative weighting coefficient.

26. Apparatus as defined by claim 23, wherein said means for determining resistivity includes means for producing the weighted sums:

0.75·X(1)+0.5·X(2)−0.25·X(3);

0.5·X(1)+0.5·X(2); and 0.25·X(1)+0.5·X(2)+0.25·X(3)

where X(1), X(2), and X(3) are, respectively, the phase shift and/or attenuation of electromagnetic energy from transmitting antennas $T_1$, $T_2$, and $T_3$.

27. Apparatus for determining resistivity of earth formations surrounding a borehole, comprising:

an elongated logging device movable through the borehole;

fifth, third, first, second, and fourth transmitting antennas longitudinally spaced on said device in the recited sequence;

a pair of longitudinally spaced receiving antennas on said device, said pair of receiving antennas being located between said first and second transmitting antennas;

said fifth, third, first, second, and fourth transmitting antennas being spaced from the midpoint between said receiver pair by fifth, third, first, second, and fourth distances, respectively, each of said fifth, third, first, second, and fourth distances being different;

means for energizing said fifth, third, first, second, and fourth transmitting antennas with electromagnetic energy;

means for receiving, at said pair of receiving antennas, electromagnetic energy from said transmitting antennas;

means for determining, from electromagnetic energy received at said pair of receiving antennas, fifth, third, first, second, and fourth phase shift and attenuation measurements of electromagnetic energy transmitted from said fifth, third, first, second, and fourth transmitting antennas, respectively; and means for determining borehole compensated resistivity of said earth formations at several radial depths of investigation from said fifth, third, first, second, and fourth phase shift and attenuation measurements.

28. Apparatus as defined by claim 27, wherein said spacings are all different by at least 1 inch.

29. Apparatus as defined by claim 27, wherein said logging device is mounted in a drill string for logging while drilling operation.

30. Apparatus as defined by claim 29, wherein said transmitting antennas are energized in sequence.

31. Apparatus as defined by claim 29, wherein said transmitting and receiving antennas are coils wound on a generally cylindrical drill collar.

32. Apparatus for determining a property of earth formations surrounding a borehole, comprising:

an elongated logging device movable through the borehole;

a sequence of spaced apart transmitting antennas with odd numbered designations 1, 3, ... (2m−1), on said device, and a sequence of spaced apart transmitting antennas with even numbered designations 2, 4, ... (2m), on said device, where m is a positive integer;

a pair of longitudinally spaced receiving antennas on said device, said pair of receiving antennas being located between said sequence of transmitting antennas with odd numbered designations and said sequence of transmitting antennas with even numbered designations;

the spacing of each of said transmitting antennas from the midpoint between said pair of receiving antennas being different than the spacing of every other transmitting antenna from the midpoint between said pair of receiving antennas;

means for energizing each of said transmitting antennas with electromagnetic energy;

means for receiving, at said pair of receiving antennas, electromagnetic energy from said transmitting antennas;

means for determining, from electromagnetic energy received at said pair of receiving antennas, phase shift and/or attenuation measurements of electromagnetic energy transmitted from each of the respective transmitting antennas; and means for determining a property of said earth formations from said phase shift and/or attenuation measurements.

33. Apparatus as defined by claim 32, wherein said spacings each differ by at least 1 inch.

34. Apparatus as defined by claim 32, wherein said property is resistivity.

35. Apparatus as defined by claim 34, wherein said means for determining resistivity includes means for combining at least one weighted measurement of phase shift and/or attenuation of electromagnetic energy from at least one of said transmitting antennas of odd numbered designations, and at least one weighted measurement of phase shift and/or attenuation of electromagnetic energy from at least one of said transmitting antennas of even numbered designations.

36. Apparatus as defined by claim 34, wherein said at least one weighted measurement of phase shift and/or attenuation of electromagnetic energy from at least one of said transmitting antennas of odd numbered designations comprises weighted measurements of phase shift and/or attenuation of electromagnetic energy from two of said transmitting antennas of odd numbered designations.

37. Apparatus as defined by claim 35, wherein said means for determining resistivity comprises means for determining borehole compensated resistivity at several radial depths of investigation.

38. Apparatus as defined by claim 36, wherein said means for determining resistivity comprises means for determining borehole compensated resistivity at several radial depths of investigation.

39. Apparatus as defined by claim 32, wherein said logging device is mounted in a drill string for logging while drilling operation.

40. Apparatus as defined by claim 38, wherein said logging device is mounted in a drill string for logging while drilling operation.

41. Apparatus as defined by claim 37, wherein said transmitting antennas are energized in sequence.

42. Apparatus as defined by claim 39, wherein said transmitting and receiving antennas are coils wound on a generally cylindrical drill collar.

43. Apparatus as defined by claim 40, wherein said transmitting and receiving antennas are coils wound on a generally cylindrical drill collar.

44. A method for determining a property of earth formations surrounding a borehole, comprising the steps of:

provifing an elongated logging device movable through the borehole, said device having thereon a sequence of spaced apart transmitting antennas with odd numbered designations $1, 3, \ldots (2m-1)$, and a sequence of spaced apart transmitting antennas with even numbered designations $2, 4, \ldots (2m)$, where m is a positive integer, and a pair of longitudinally spaced receiving antennas, said pair of receiving antennas being located between said sequence of transmitting antennas with odd numbered designations and said sequence of transmitting antennas with even numbered designations, the spacing of each of said transmitting antennas from the midpoint between said pair of receiving antennas being different than the spacing of every other transmitting antenna from the midpoint between said pair of receiving antennas;

energizing each of said transmitting antennas with electromagnetic energy;

receiving, at said pair of receiving antennas, electromagnetic energy from said transmitting antennas;

determining, from electromagnetic energy received at said pair of receiving antennas, phase shift and/or attenuation measurements of electromagnetic energy transmitted from each of the respective transmitting antennas; and determining a property of said earth formations from said phase shift and/or attenuation measurements.

45. The method as defined by claim 44, wherein said property is resistivity, and wherein said step of determining resistivity includes combining at least one weighted measurement of phase shift and/or attenuation of electromagnetic energy from at least one of said transmitting antennas of odd numbered designations, and at least one weighted measurement of phase shift and/or attenuation of electromagnetic energy from at least one of said transmitting antennas of even numbered designations.

46. The method as defined by claim 44, wherein said property is resistivity, and wherein said at least one weighted measurement of phase shift and/or attenuation of electromagnetic energy from at least one of said transmitting antennas of odd numbered designations comprises weighted measurements of phase shift and/or attenuation of electromagnetic energy from two of said transmitting antennas of odd numbered designations.

47. The method as defined by claim 46, wherein said step of determining resistivity comprises determining borehole compensated resistivity at several radial depths of investigation.

48. The method as defined by claim 44, wherein said method is performed as a logging while drilling operation.

49. The method as defined by claim 46, wherein said method is performed as a logging while drilling operation.

50. The method as defined by claim 49, further comprising the step of modifying the weightings of said measurements as part of said logging while drilling operation.

51. Apparatus for determining resistivity of earth formations surrounding a borehole, comprising:

an elongated logging device movable through the borehole;

first, third, and second transmitting antennas longitudinally spaced on said device;

a pair of longitudinally spaced receiving antennas on said device, said pair of receiving antennas being located between said second transmitting antenna and one of said first and third transmitting antennas;

said first, third, and second transmitting antennas being spaced from the midpoint between said receiver pair by first, third, and second distances, respectively, said first and second distances being substantially the same;

means for energizing said first, third, and second transmitting antennas with electromagnetic energy;

means for receiving, at said pair of receiving antennas, electromagnetic energy from said transmitting antennas;

means for determining, from electromagnetic energy received at said pair of receiving antennas, first, third, and second phase shift and attenuation measurements of electromagnetic energy transmitted from said first, third, and second transmitting antennas, respectively; and means for determining resistivity of said earth formations at four borehole compensated radial depths of investigation from said first, third, and second phase shift and attenuation measurements;

the resistivity at two of said borehole compensated depths of investigation being respectively determined from an average of phase shift measurements of electromagnetic energy from said first and second transmitting antennas, and an average of attenuation measurements of electromagnetic energy from said first and second transmitting antennas, and the resistivity at the other two of said borehole compensated depths of investigation being respectively determined from the phase shift measurement of electromagnetic energy from said third transmitting antenna compensated by phase shift measurements of electromagnetic energy from said first and second transmitting antennas, and from the attenuation measurement of electromagnetic energy from said third transmitting antenna compensated by attenuation measurements of electromagnetic energy from said first and second transmitting antennas.

52. Apparatus as defined by claim 51, wherein said third distance is smaller than said second distance.

53. Apparatus as defined by claim 51, wherein said third distance is greater than said second distance.

54. Apparatus as defined by claim 51, wherein resistivity at said other two borehole compensated depths of investigation are respectively determined from the phase shift measurement of electromagnetic energy from said third transmitting antenna, compensated by an error value that depends on the difference between the phase shift measurements of electromagnetic energy from said first and second transmitting antennas, and from the attenuation measurement of electromagnetic energy from said third transmitting antenna, compensated by an error value that depends on the difference between the attenuation measurements of electromagnetic energy from said first and second transmitting antennas.

55. Apparatus as defined by claim 54, wherein said logging device is mounted in a drill string for logging while drilling operation.

* * * * *